United States Patent
Csapo et al.

(10) Patent No.: US 7,464,995 B2
(45) Date of Patent: Dec. 16, 2008

(54) FABRICATED VEHICLE WHEEL HAVING SPOKES AND STIFFENING RIBS

(75) Inventors: Montgomery D. Csapo, Livonia, MI (US); Thomas Czarniecki, Dearborn, MI (US); John David Holm, Superior Township, MI (US); Thomas E. Heck, Monroe, MI (US); Günter Stelzer, Bad Honnef (DE); Karl Rode, Konigswinter (DE); Werner Kermelk, Much (DE); Alan Coleman, Southgate, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 11/452,113

(22) Filed: Jun. 13, 2006

(65) Prior Publication Data

US 2007/0222279 A1    Sep. 27, 2007

Related U.S. Application Data

(63) Continuation-in-part of application No. 10/836,828, filed on Apr. 30, 2004, now Pat. No. 7,059,685, which is a continuation of application No. PCT/US02/17534, filed on May 31, 2002.

(51) Int. Cl.
*B60B 3/12* (2006.01)

(52) U.S. Cl. .............. 301/63.107; 301/35.626; 301/64.101

(58) Field of Classification Search ............ 301/35.626, 301/63.101, 63.103, 63.106, 63.107, 63.108, 301/64.101, 35.632
See application file for complete search history.

(56) References Cited

U.S. PATENT DOCUMENTS

| | | | | |
|---|---|---|---|---|
| 1,840,824 A | * | 1/1932 | Sinclair | 301/6.1 |
| 2,043,875 A | * | 6/1936 | Zerk | 301/35.59 |
| 2,083,229 A | * | 6/1937 | Horn et al. | 29/894.325 |

(Continued)

*Primary Examiner*—Russell D Stormer
(74) *Attorney, Agent, or Firm*—MacMillan, Sobanski & Todd, LLC

(57) ABSTRACT

According to the invention, the fabricated vehicle wheel includes a conventional full wheel rim and a unique wheel disc joined to the wheel rim. The wheel disc includes an inner wheel mounting pad, an outer annular rim connecting flange and a plurality of radial spokes connecting the inner wheel mounting pad to the rim connecting flange. The rim connecting flange extends in an axial direction and defines a side edge surface extending between each pair of adjacent spokes. A plurality of windows are formed in the wheel disc. Each of the windows has a predetermined shape defined by the adjacent spokes and the side edge surface of the rim connecting flange. The rim connecting flange and the side edge surface are configured such that the window extends to an outermost periphery of the wheel disc. The inner wheel mounting pad includes at least one rib provided therein. The rib has an outer surface and an inner surface, at least one of the outer surface and the inner surface is provided with a flat planar surface.

13 Claims, 10 Drawing Sheets

U.S. PATENT DOCUMENTS

| | | | |
|---|---|---|---|
| 2,112,615 A * | 3/1938 | Zerk | 301/35.59 |
| 2,141,457 A * | 12/1938 | Ash | 301/35.59 |
| 2,187,032 A * | 1/1940 | Horn et al. | 301/64.101 |
| 2,317,311 A * | 4/1943 | Stough | 301/35.626 |
| 2,840,422 A * | 6/1958 | Main et al. | 301/63.104 |
| 4,181,364 A * | 1/1980 | Reppert | 301/8 |
| 4,256,346 A * | 3/1981 | Kawaguchi et al. | 301/79 |
| 5,544,945 A * | 8/1996 | Daudi | 301/164.101 |
| 5,971,496 A * | 10/1999 | Duning et al. | 301/35.626 |
| 6,785,962 B2 * | 9/2004 | Coleman | 29/894.325 |
| 2005/0017570 A1 * | 1/2005 | Alff et al. | 301/63.101 |
| 2008/0034587 A1 * | 2/2008 | McCorry et al. | 29/894.323 |

* cited by examiner

FABRICATED VEHICLE WHEEL HAVING SPOKES AND STIFFENING RIBS

CROSS-REFERENCE TO RELATED APPLICATIONS

This application is a continuation-in-part of U.S. Ser. No. 10/836,828 filed Apr. 30, 2004, now U.S. Pat. No. 7,059,685, which is a continuation of PCT/US02/17534, filed May 31, 2002, and is related to co-pending U.S. application Ser. No. 11/365,972, filed Mar. 1, 2006.

BACKGROUND OF THE INVENTION

This invention relates in general to vehicle wheels and in particular to an improved fabricated vehicle wheel.

A conventional fabricated vehicle wheel is typically of a two-piece construction and includes an inner disc and an outer "full" rim. The disc may be fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

SUMMARY OF THE INVENTION

This invention relates to an improved fabricated spoked vehicle wheel. According to the invention, the fabricated vehicle wheel includes a conventional full wheel rim and a unique wheel disc joined to the wheel rim. The wheel disc includes an inner wheel mounting pad, an outer annular rim connecting flange and a plurality of radial spokes connecting the inner wheel mounting pad to the rim connecting flange. The rim connecting flange extends in an axial direction and defines a side edge surface extending between each pair of adjacent spokes. A plurality of windows are formed in the wheel disc. Each of the windows has a predetermined shape defined by the adjacent spokes and the side edge surface of the rim connecting flange. The rim connecting flange and the side edge surface are configured such that the window extends to an outermost periphery of the wheel disc. The inner wheel mounting pad includes at least one rib provided therein. The rib has an outer surface and an inner surface, at least one of the outer surface and the inner surface is provided with a flat planar surface.

Other advantages of this invention will become apparent to those skilled in the art from the following detailed description of the preferred embodiments, when read in light of the accompanying drawings.

DESCRIPTION OF THE INVENTION

Figure 1:
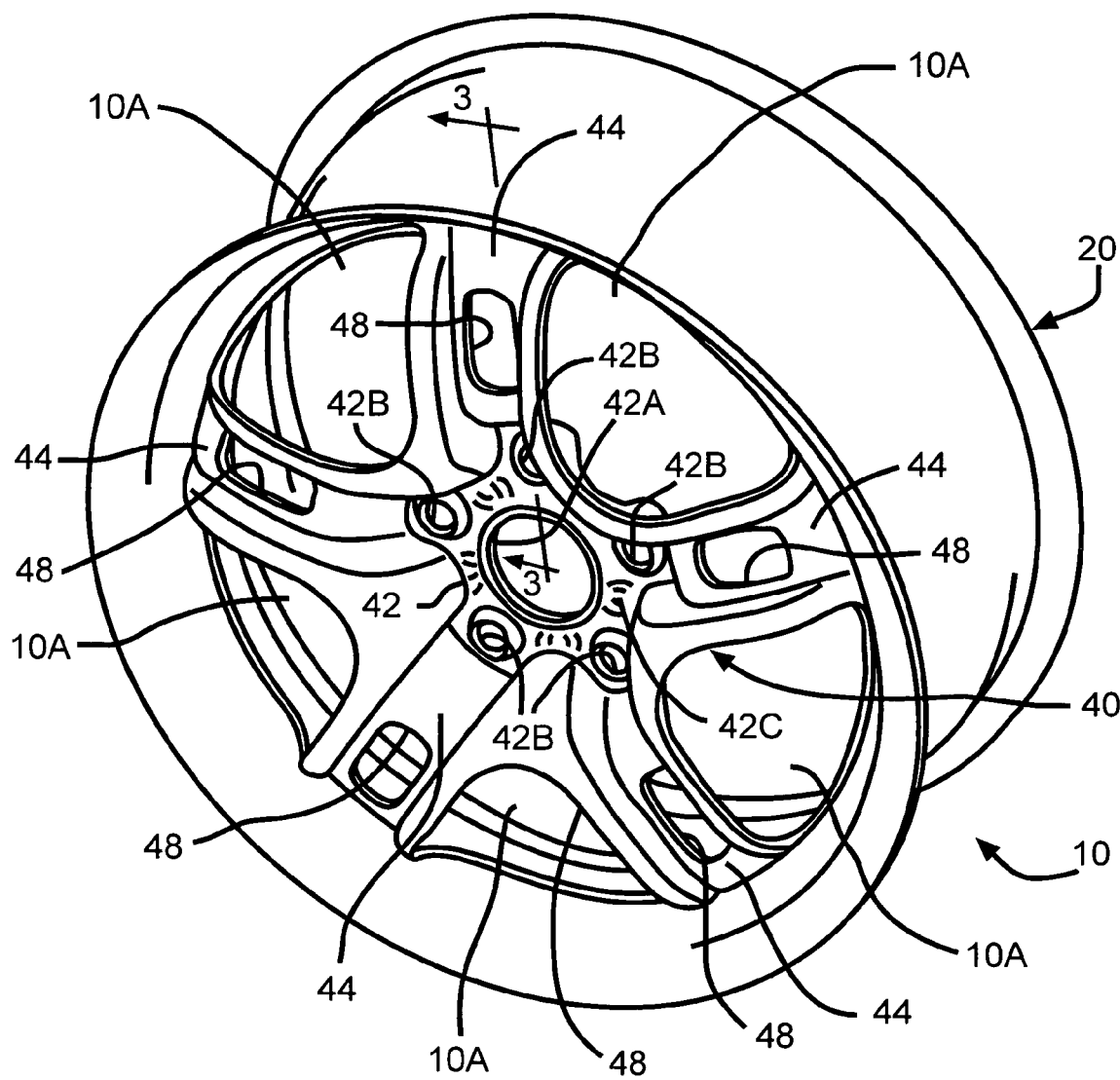
FIG. 1 is a view of a first embodiment of a fabricated vehicle wheel.
Figure 2:
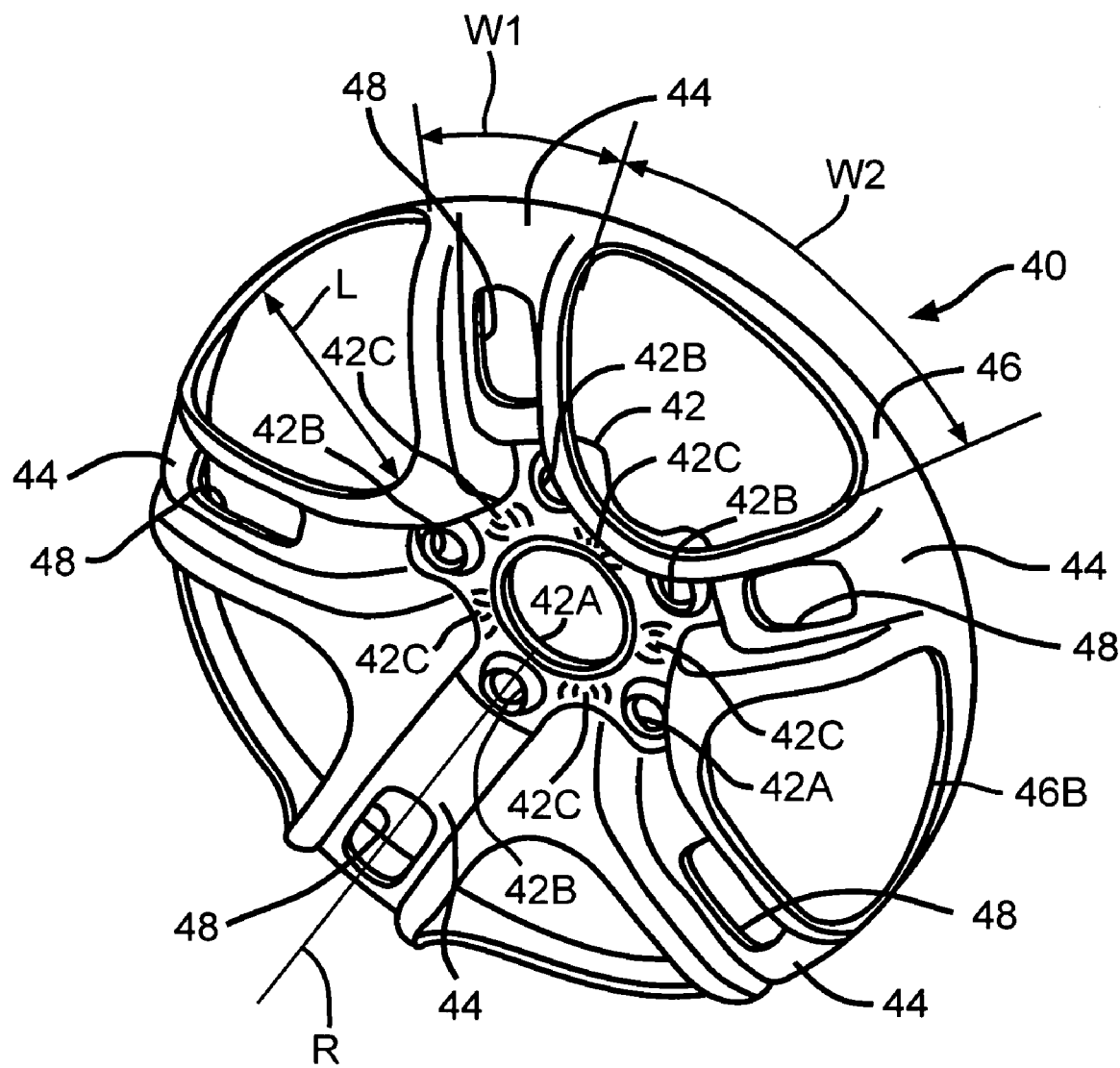
FIG. 2 is a view of the wheel disc illustrated in FIG. 1.
Figure 3:
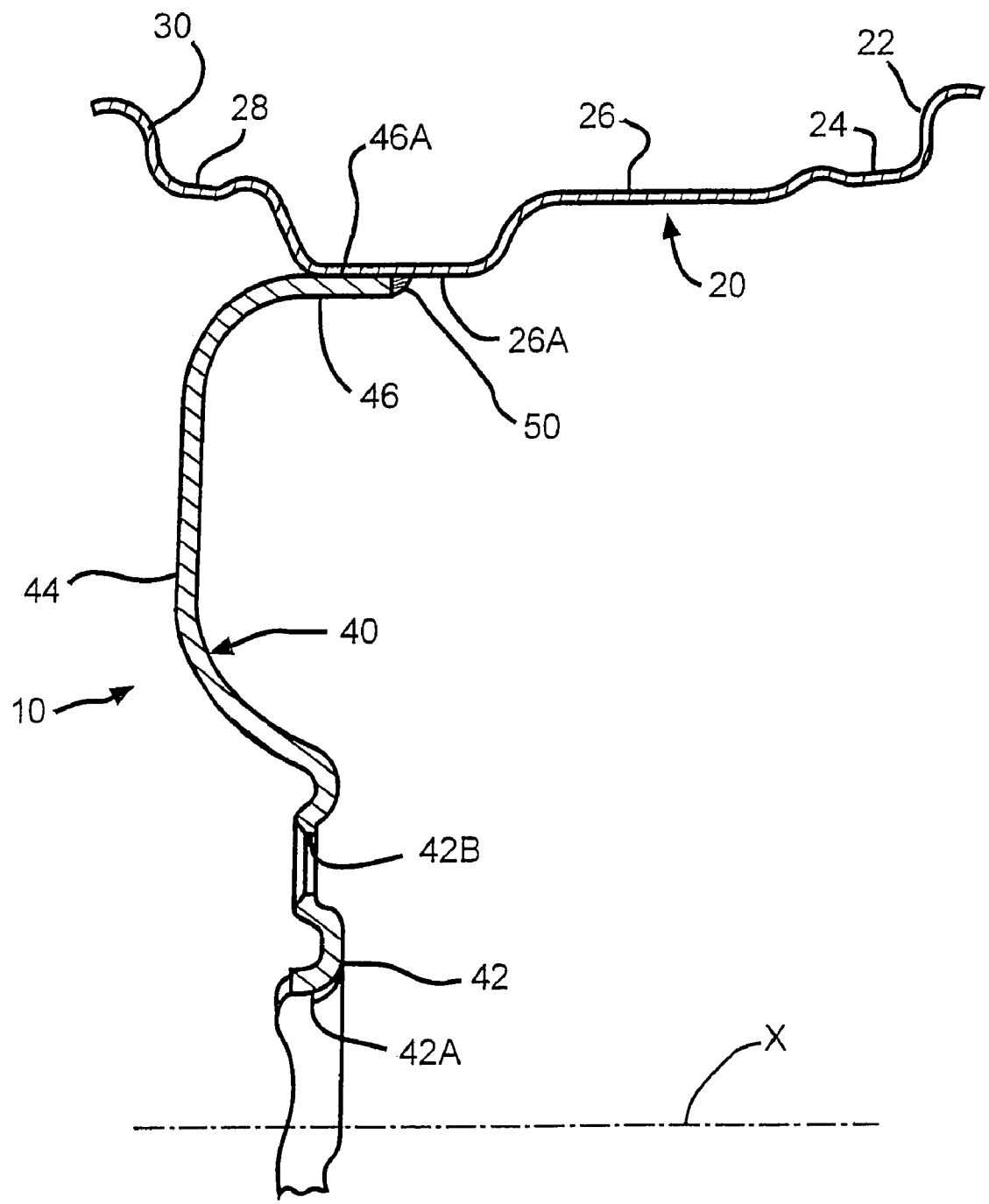
FIG. 3 is a sectional view of a portion of the vehicle wheel taken along line 3-3 of FIG. 1, except showing solid spokes.

Referring now to drawings, there is illustrated in FIGS. 1-3 a first embodiment of a fabricated vehicle wheel, indicated generally at 10. The vehicle wheel 10 shown in the embodiment is illustrated as being a fabricated drop center or well attached vehicle wheel. The fabricated bead drop center vehicle wheel 10 includes a full wheel rim 20 and an inner wheel disc 40 which are constructed and joined together by suitable means.

In the illustrated embodiment, the wheel rim 20 is fabricated rim formed from a suitable material, such as for example, steel, aluminum or alloys thereof, magnesium, or titanium. As shown in FIG. 3, the wheel rim 20 includes an inboard tire bead seat retaining flange 22, an inboard tire bead seat 24, a generally axially extending well 26, an outboard tire bead seat 28, and an outboard tire bead seat retaining flange 30. The well 26 includes an inner surface 26A.

In the illustrated embodiment, the wheel disc 40 is fabricated or otherwise formed from a suitable material, such as for example, steel, aluminum or alloys thereof, steel, magnesium, or titanium. The wheel disc 40 defines a wheel axis X and includes a generally centrally located wheel mounting surface or pad 42, a plurality of outwardly extending spokes 44, and an outer band or flange 46. In the illustrated embodiment, the disc 40 includes five of such spokes 44 which are shown as being formed integral with the wheel mounting surface 42 and the outer flange 46. Alternatively, the number and/or the construction of the spokes 44 may be other than illustrated if so desired. For example, the vehicle wheel 10 may include less than five spokes 44 or more than five spokes 44. Also, the spokes 44 and the outer flange 46 may be formed integral with one another but separate from the wheel mounting surface 42 of the disc 40 and joined thereto by a suitable method.

In the illustrated embodiment, the wheel mounting surface 42 is provided with a centrally located pilot aperture 42A and a plurality of lug bolt receiving holes 42B circumferentially spaced around the pilot aperture 42A. In the illustrated embodiment, the wheel mounting surface 42 includes five of such lug bolt receiving holes 42B which are preferably provided in the wheel mounting surface 42 in line with a respective one of each of the spokes 44. Alternatively, the number and/or the location of the lug bolt receiving holes 42B may be other than illustrated if so desired. As is known, the lug bolt receiving holes 42B receive lug bolts (not shown) and nuts (not shown) for securing the vehicle wheel 10 on an axle (not shown) of a vehicle.

In the illustrated embodiment, the mounting surface 42 preferably further includes a plurality of strengthening ribs 42C provided therein. In the illustrated embodiment, a rib 42C is located between each pair of lug bolt receiving holes 42B. In the illustrated embodiment, each of the ribs 42C is defined by a raised or embossed area which extends outwardly from or above the mounting surface 42. The ribs 42C are operative to strengthen the mounting surface 42 to keep it from flexing during vehicle operation thereby improving the fatigue life of the associated vehicle wheel. Alternatively, the spacing, location, number and/or configuration of the ribs 42C may be other than illustrated and described if so desired.

In the illustrated embodiment, the wheel disc 40 may also include one or more spoke openings 48 formed in one or more of each of the spokes 44. In the illustrated embodiment of FIGS. 1 and 2, one of such spoke openings 48 is provided in each of the spokes 44. Alternatively, the number and/or the location of the spoke openings 48 may be other than illustrated if so desired. Also, as shown in FIG. 3, the spoke 44 may be formed as a solid spoke not having the spoke opening 48 formed therein. As shown in this embodiment, the outer flange 46 extends solely in a generally axial direction, defines an annular mounting flange and includes an outer surface 46A and a side edge surface 46B (shown in FIG. 2), extending between adjacent pairs of spokes 44. As shown in FIG. 2, the side edge surface 46B faces in a generally axial outboard direction. Alternatively, the construction or shape of the outer flange 46 may be other than illustrated if so desired.

To assemble the vehicle wheel 10 in the illustrated embodiment, the wheel rim 20 and the wheel disc 40 are located relative to one another in a predetermined position. In particular, the outer surface 46A of the mounting flange 46 is positioned adjacent the inner surface 26A of the well 26 of the wheel rim 20 and a weld 50 (shown in FIG. 3) is applied to join the wheel disc 40 and the wheel rim 20 together to produce the fabricated well attached vehicle wheel. Preferably, the weld 50 consists of five discrete welds a respective one applied at each of the five spoke portions of the wheel. Alternatively, other welding patterns may be used to join the disc 40 to the rim 20 including a full, continuous weld if so desired. Alternatively, the wheel rim 20 and the wheel disc 40 may be joined together by using one or a combination of other suitable methods, such as for example, welding, adhesives, and mechanical fasteners, such as for example, rivets.

As may be seen in FIG. 1, due to the construction of the wheel disc 40, the resultant wheel 10 has a relatively large vent window 10A formed therein between each pair of adjacent spokes 44. As shown in FIG. 1, each window 10A has a predetermined shape defined by each pair of adjacent spokes 44 and the side edge surface 46B of the rim connecting flange 46 such that each window 10A extends to an outermost periphery of the wheel disc 40.

As shown in FIG. 2, in the illustrated embodiment each spoke 44 defines an angular extent W1, which is defined at an outer radial periphery of spoke, and each vent window 10A defines an angular extent W2, which is defined at an outer radial periphery of the window. Preferably, in the illustrated embodiment, the vent window angular extent W2 is greater than the spoke angular extent W1. More preferably, the vent window angular extent W2 is at about 2.0 times the spoke angular extent W1. Also, in the illustrated embodiment, each vent window 10A defines a radial length L, which is defined between the outer radially periphery of the vent window and a nose or inner portion of the vent window. Preferably, the vent window length L is greater than the spoke width W1. Alternatively, one or more of the widths W1 and W2 and the length L may be other than illustrated if so desired.

Also, while the wheel disc 40 is shown for use in constructing a fabricated well attached vehicle wheel, the wheel disc 40 could be used to produce other types of fabricated vehicle wheels. For example, the wheel disc 40 could be used to produce a fabricated bead seat attached vehicle wheel or a fabricated full face vehicle wheel. Also, as shown in FIG. 2, each spoke 44 defines a radial line R intersecting the wheel axis X and each spoke 44 is preferably symmetrical with respect to the radial line R. In addition, as shown in FIG. 2, each of the lug bolt holes 42B is preferably located along the radial line R of each of the spokes 44.

Figure 4:
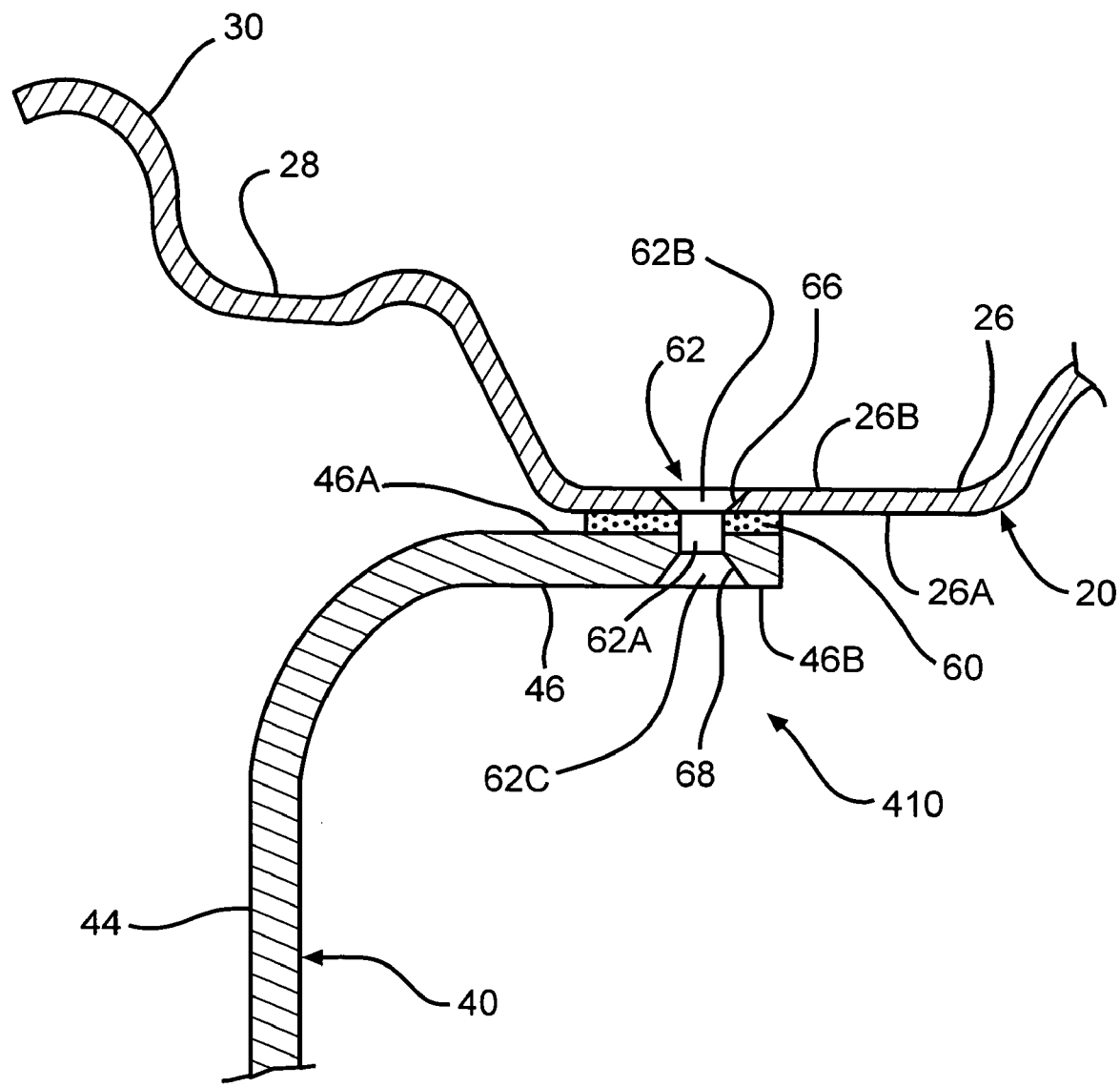
FIG. 4 is an enlarged view of a portion of the vehicle wheel illustrated in FIG. 3 showing an alternate method for joining the wheel disc to the wheel rim.

Alternatively, as shown in FIG. 4, the wheel disc 40 and the wheel rim 20 may be secured together by using an adhesive 60 and a plurality of suitable fasteners 62 (only one of such fasteners 62 being illustrated in FIG. 4). Preferably, a suitable adhesive 60 is first applied to the outer surface 46A of the mounting flange 46. A suitable adhesive 60 is a one part epoxy available under the name BETAMATE® 4601, manufactured by Dow Chemical Company of Midland, Mich. Alternatively, the type and/or the application of the adhesive 60 may be other than illustrated and described if so desired. For example, the adhesive 46 may be first applied to the inner surface 26A of the well 26 of the wheel rim 20.

Next, the wheel rim 20 and the wheel disc 40 are located relative to one another in a predetermined position. In this position, the well inner surface 26A is disposed adjacent the mounting flange outer surface 46A. While in this position, a plurality of wheel rim holes 66 and mounting flange holes 68 are preferably formed in the wheel rim 20 and wheel disc 40, respectively, at the same time by a suitable method, such as for example, by piercing, drilling or laser cutting. Forming the holes 66 and 68 in this manner ensures that the holes are in proper alignment. Next, a suitable fastener 62 is installed in each of the aligned holes 66 and 68 to thereby join the wheel rim 20 and the wheel disc 40 together. Alternatively, the holes 66 and 68 may be separately provided in one or both of the wheel rim 20 and the wheel disc 40 prior to assembly if so desired.

In the illustrated embodiment, the fastener 62 is a rivet and includes a generally round body 62A, an outer or head portion 62B, and an inner portion 62C. Also, the holes 66 and 68 are preferably countersunk holes so that when the rivet 62 is installed no portion of the rivet 62 protrudes outside of a well outer surface 26B and a mounting flange inner surface 46B of the wheel rim 20 and the wheel disc 40, respectively. Alternatively, the type, configuration, location and/or the number of fasteners 62 that are used may be other than illustrated if so desired.

Figure 5:
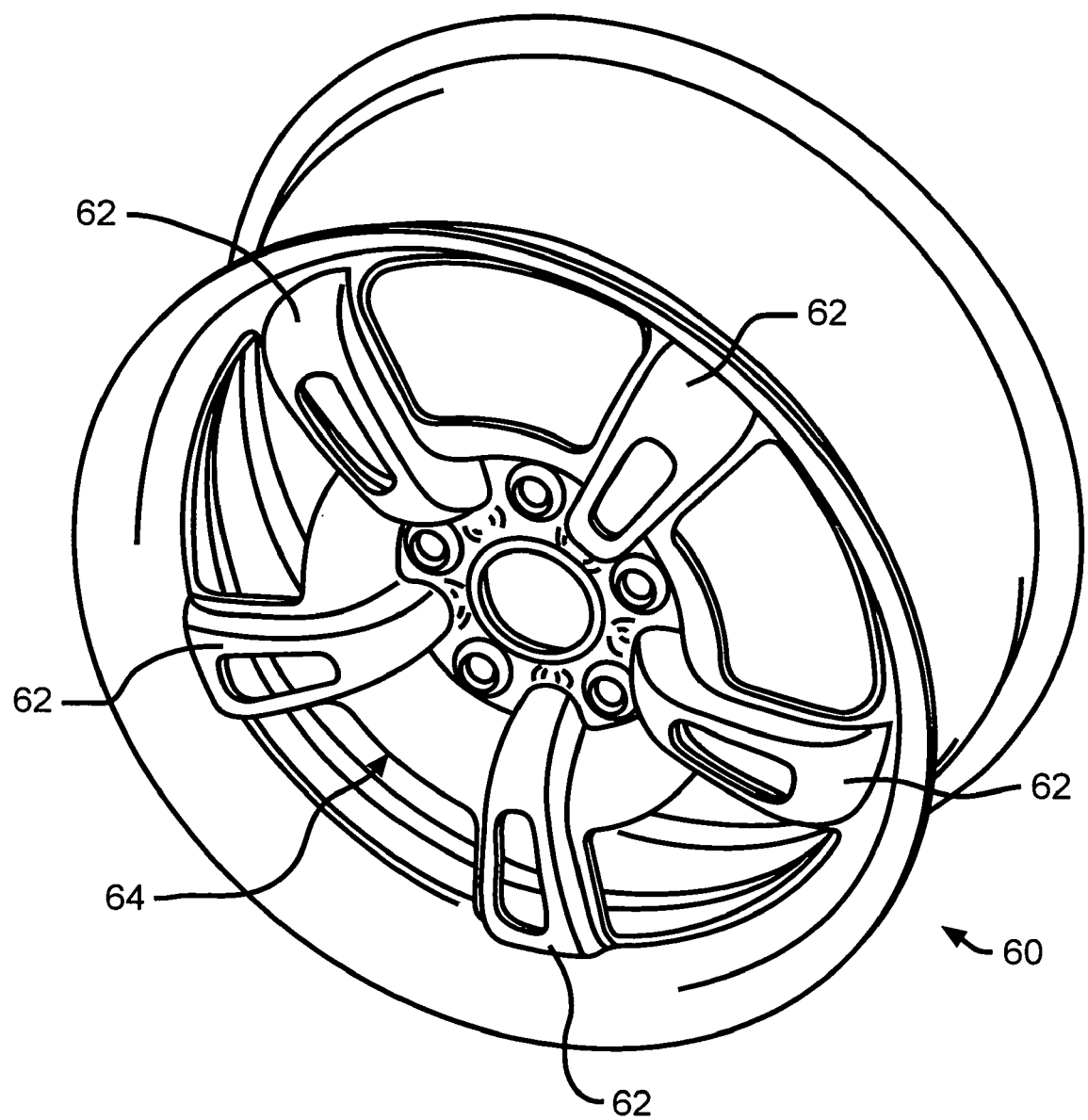
FIG. 5 is a view of a second embodiment of a fabricated vehicle wheel.
Figure 6:
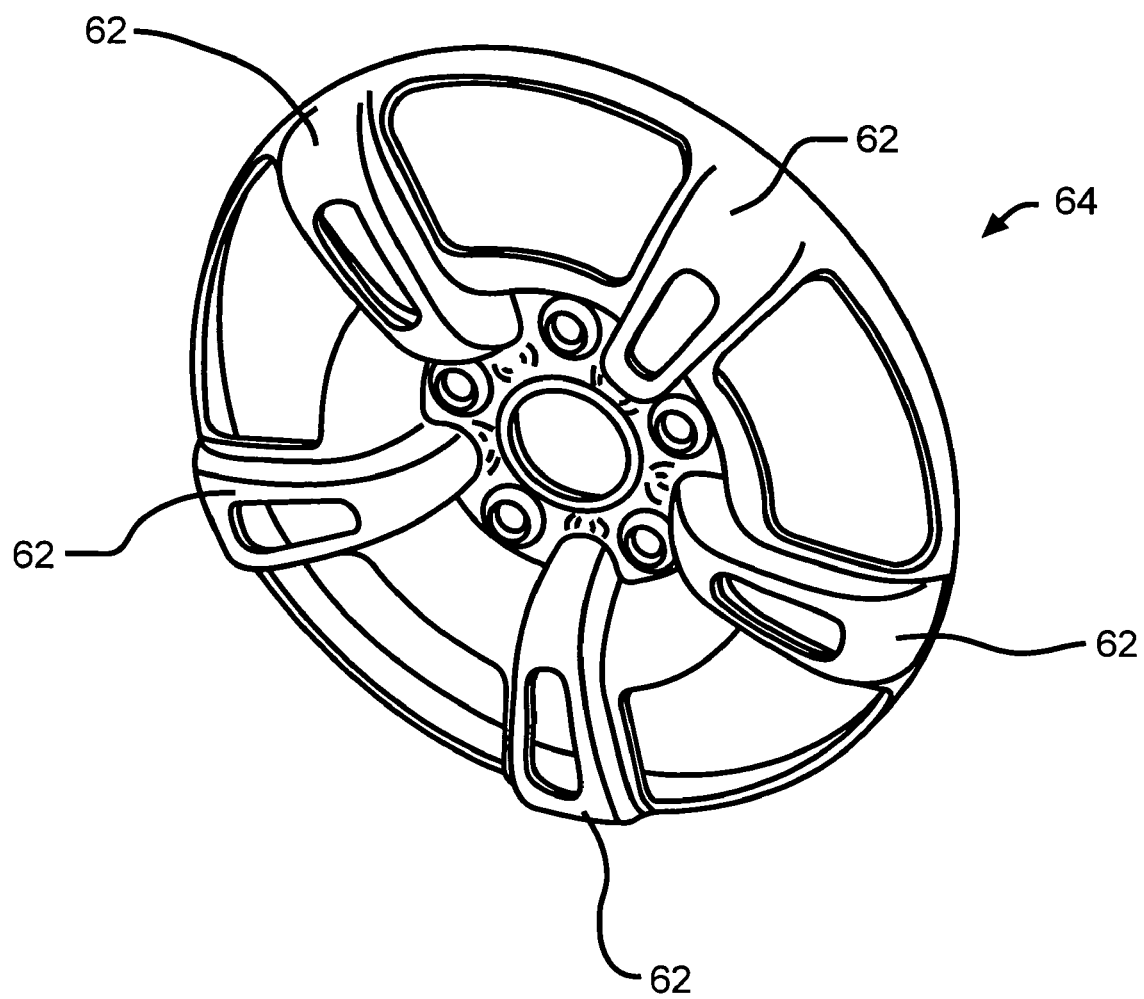
FIG. 6 is a view of the wheel disc illustrated in FIG. 5.

Referring now to FIGS. 5 and 6, there is illustrated a second embodiment of a fabricated vehicle wheel, indicated generally at 60, produced in accordance with the present invention. The vehicle wheel 60 produced according to this invention is illustrated as being a fabricated drop center vehicle wheel. In this embodiment, spokes 62 of an inner wheel disc 64 are inverted or reversed compared to the spokes 44 of the wheel disc 40 of the vehicle wheel 10 illustrated in FIGS. 1-3. Thus, in this embodiment, the spokes 62 of the wheel disc 64 project outwardly as opposed to the spokes 44 of the wheel disc 40 which project inwardly.

Referring now FIGS. 7-10, there is illustrated a third embodiment of a fabricated inner wheel disc, indicated generally at 70, for use in producing a fabricated vehicle wheel (not shown). The fabricated inner wheel disc 70 shown in the embodiment is illustrated as being adapted for use in a fabricated drop center or well attached vehicle wheel. The fabricated bead drop center vehicle wheel includes a full wheel rim (not shown) and the inner wheel disc 70 which are constructed and joined together by suitable means. Alternatively, the wheel disc 70 may be used in other types of wheel constructions, such as for example, a bead seat attached type of vehicle wheel, if so desired.

In the illustrated embodiment, the wheel disc 70 is fabricated or otherwise formed from a suitable material, such as for example, steel, aluminum or alloys thereof, steel, magnesium, or titanium. The wheel disc 70 defines a wheel axis X1 and includes a generally centrally located wheel mounting surface or pad 72, a plurality of outwardly extending spokes 74, and an outer band or flange 76. In the illustrated embodiment, the wheel disc 70 includes five of such spokes 74 which are shown as being formed integral with the wheel mounting surface 72 and the outer flange 76. Alternatively, the number and/or the construction of the spokes 74 may be other than illustrated if so desired. For example, the wheel disc 70 may include less than five spokes 74 or more than five spokes 74. Also, the spokes 74 and the outer flange 76 may be formed integral with one another but separate from the wheel mounting surface 72 of the disc 70 and joined thereto by a suitable method.

In the illustrated embodiment, the wheel mounting surface 72 is provided with a centrally located pilot aperture 72A and a plurality of lug bolt receiving holes 72B circumferentially spaced around the pilot aperture 72A. In the illustrated embodiment, the wheel mounting surface 72 includes five of such lug bolt receiving holes 72B which are preferably provided in the wheel mounting surface 72 in line with a respective one of each of the spokes 74. Alternatively, the number and/or the location of the lug bolt receiving holes 72B may be other than illustrated if so desired. For example, the lug bolt receiving holes 72B may not be in line with a respective one of each of the spokes 74 and/or the number of lug bolt receiving holes 72B and the number of spokes 72 may not be the same. As is known, the lug bolt receiving holes 72B receive lug bolts (not shown) and nuts (not shown) for securing the associated vehicle wheel on an axle (not shown) of a vehicle.

Figure 9:
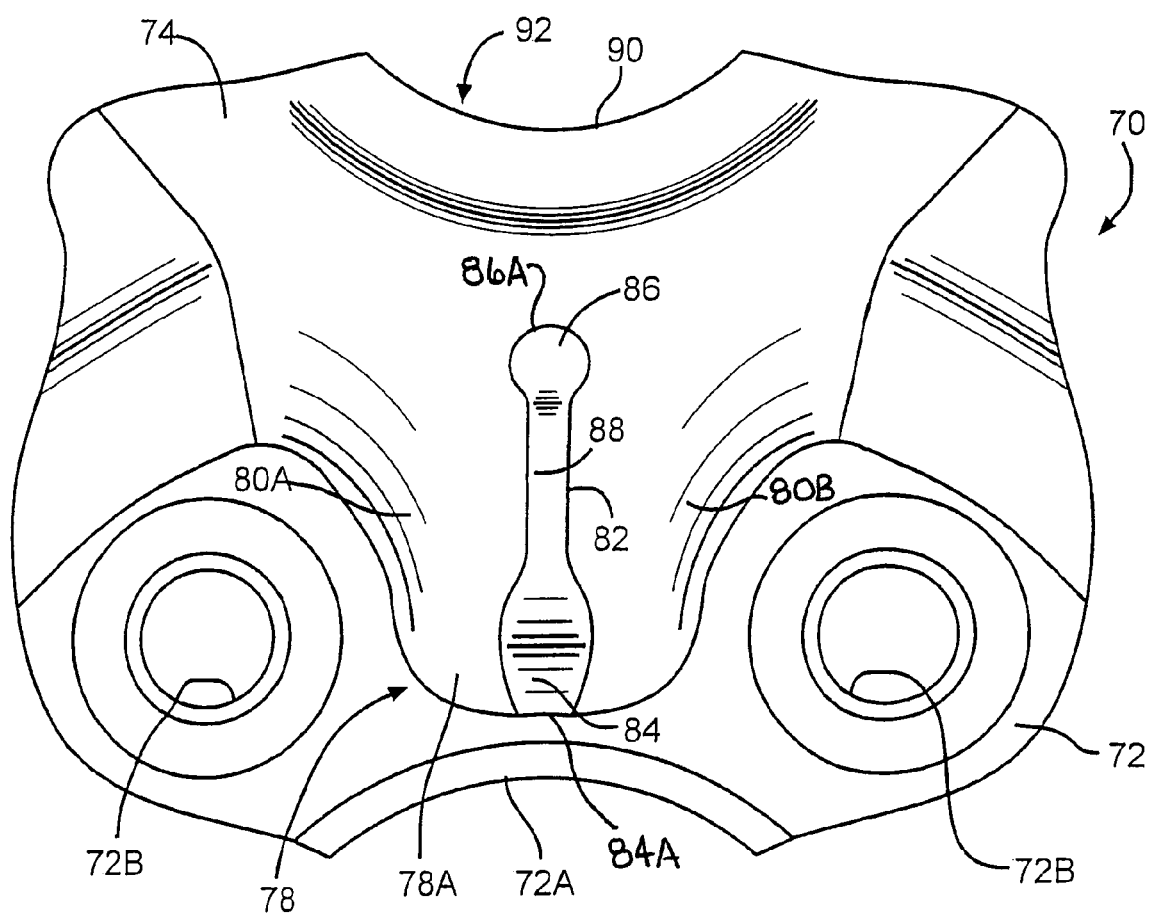
FIG. 9 is an enlarged view of a portion of the vehicle wheel illustrated in FIGS. 7 and 8, showing the exterior or street side of the vehicle wheel.

In the illustrated embodiment, the mounting surface 72 preferably further includes a plurality of strengthening ribs, indicated generally at 78, provided therein by a suitable metal forming process, such as for example, a stamping or hydroforming process. In the illustrated embodiment, a rib 78 is located between each pair of lug bolt receiving holes 72B. As best shown in FIG. 9, each rib 78 is defined by a raised or embossed area which extends outwardly from or above the mounting surface 72. The mounting surface 72 defines an axis X2 which is generally perpendicular to the axis X1. Alternatively, the spacing, location, number and/or configuration of one or more of the ribs 78 may be other than illustrated and described if so desired.

As best shown in FIG. 9, each rib 78 includes an exterior or outer surface 78A having a pair of side portions 80A and 80B and a center or middle portion 82. In the illustrated embodiment, the side portions 80A and 80B are generally curved or rounded surfaces and the center portion 82 is a generally or substantially flat or planar surface. The center portion 82 is formed by a suitable metal forming process, such as for example, by a stamping or hydroforming process.

In the illustrated embodiment, the center portion 82 of the rib 78 includes a first or inner end portion 84, a second or outer end portion 86, and an intermediate portion 88. The first portion 84 includes an end 84A which originates in the mounting surface 72 and extends radially outwardly into the intermediate portion 88. The second portion 86 includes an end 86A which extends into the disc 70 near an inner or nose portion 90 of a vent window 92. In the illustrated embodiment, the shape of the portions 84, 86 and 88 are different from one another.

Figure 8:
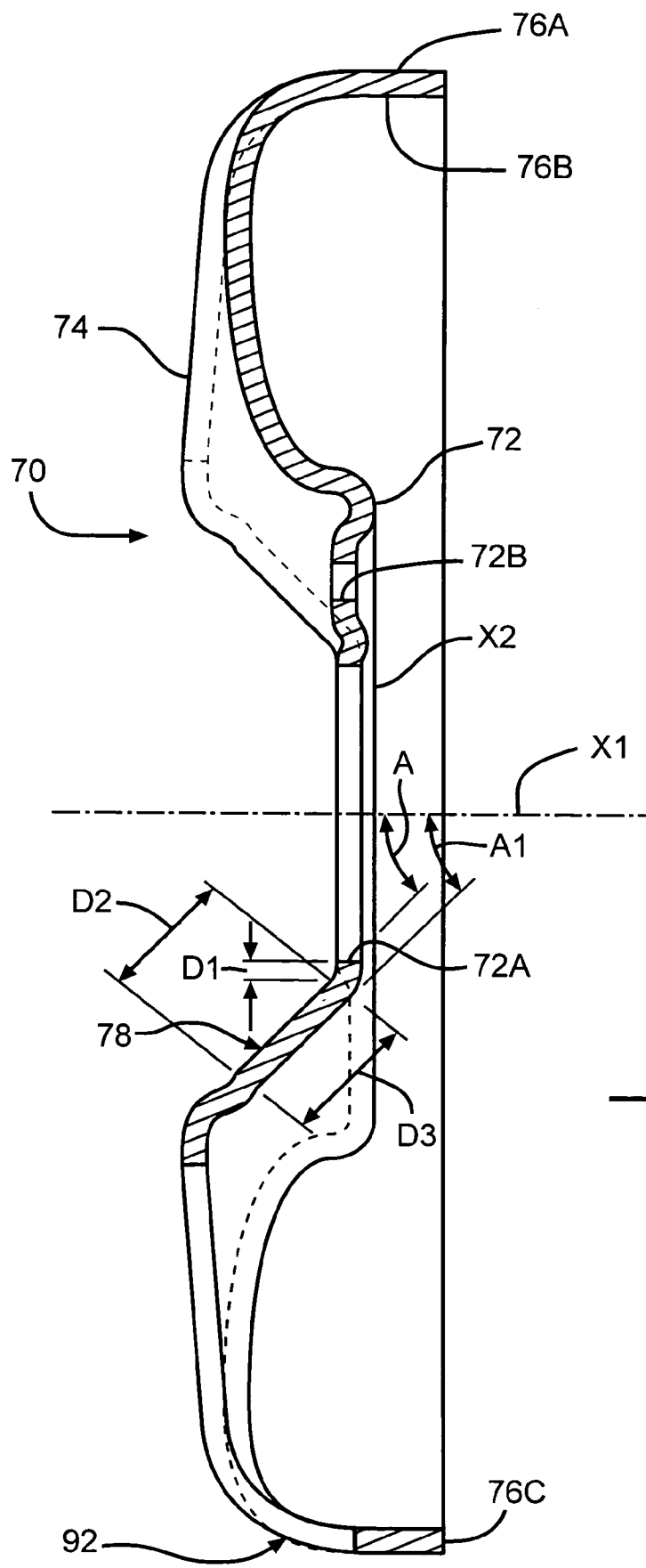
FIG. 8 is a sectional view taken along line 8-8 of FIG. 7.

As shown in FIG. 8, in the illustrated embodiment, the first portion 84 (as identified as shown in FIG. 9), extends generally parallel with respect to the mounting surface axis X2 and generally perpendicular with respect to the wheel axis X1, and extends a first distance D1. In the illustrated embodiment, the first distance D1 is approximately between about 2.5 mm to about 7.5 mm. Alternatively, the first distance D1 may be other than illustrated if so desired.

As shown in FIG. 8, in the illustrated embodiment, the intermediate portion 88 and the second portion 86 (as both are identified as shown in FIG. 9), extend at an angle A relative to the wheel axis X1 and extend a total or combined distance D2. Preferably, the angle A is in the range of from about 15 degrees to about 75 degrees. In the illustrated embodiment, the angle A is approximately 45 degrees. In the illustrated embodiment, the second distance D2 is approximately between about 20 mm to about 40 mm. Alternatively, the angle A and/or the second distance D2 may be other than illustrated if so desired. Alternatively, the shape or construction of the exterior surface of the ribs 78 may be other than illustrated if so desired.

Figure 10:
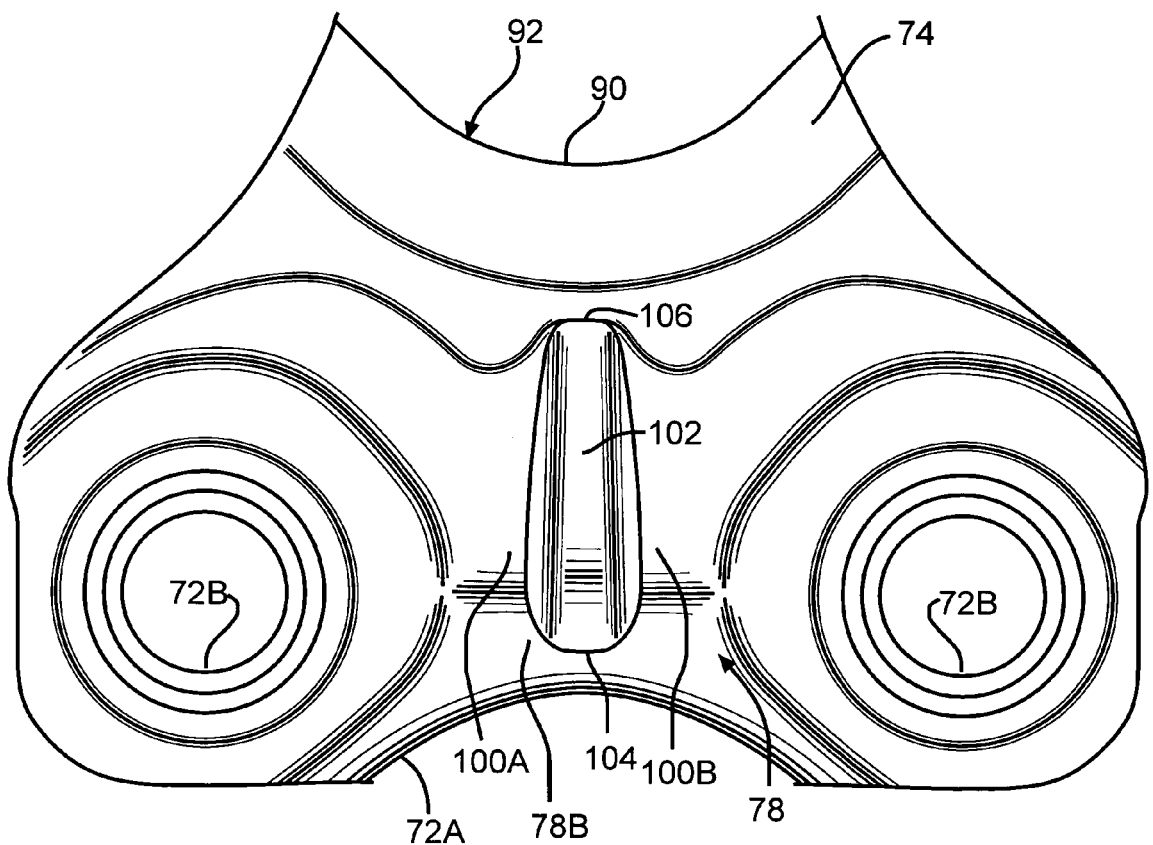
FIG. 10 is another enlarged view of a portion of the vehicle wheel illustrated in FIGS. 7 and 8, showing the interior or backside of the vehicle wheel.

As best shown in FIG. 10, each rib 78 includes an interior or inner surface 78B having a pair of side portions 100A and 100B and a center or middle portion 102. In the illustrated embodiment, the side portions 100A and 100B are generally curved or rounded surfaces and the center portion 102 is a generally flat or planar surface. The center portion 102 is formed by a suitable metal forming process, such as for example, by a stamping or hydroforming process.

In the illustrated embodiment, the center portion 102 of the rib 78 includes a first or inner end 104 and a second or outer end 106. The first end 104 of the center portion 102 of the rib 78 is located in the mounting surface 72 adjacent to or proximate the center hole 72A so as to generally blend or transition into the center hole 72A. The second end 106 of the center portion 102 of the rib 78 is located near the inner portion 90 of the window 92. In the illustrated embodiment, the shape of the center portion 102 of the rib 78 is generally uniform throughout its entire length with a slight tapering of the sides.

In the illustrated embodiment, the center portion 102 extends at an angle A1 relative to the mounting surface axis X2 and extends a third distance D3. Preferably, the angle A1 is complimentary to the angle A and thus is in the range of from about 15 degrees to about 75 degrees. In the illustrated embodiment, the angle A1 is approximately 45 degrees. In the illustrated embodiment, the third distance D3 is approximately about 20 mm to about 40 mm. Alternatively, the angle A1 and/or the third distance D3 may be other than illustrated if so desired. Alternatively, the shape or construction of the interior surface 78B of the ribs 78 may be other than illustrated if so desired.

As shown in FIG. 8, in the illustrated embodiment, the outer flange 76 extends solely in a generally axial direction, defines an annular mounting flange and includes an outer surface 76A, an inner surface 76B, and a side edge surface 76C extending between adjacent pairs of spokes 74. As shown in FIG. 8, the side edge surface 76C faces in a generally axial outboard direction. Alternatively, the construction or shape of the outer flange 76 may be other than illustrated if so desired. The outer flange 76 may be connected to a wheel rim wheel similar to that discussed above with respect to the embodiment shown in FIGS. 1-3.

To assemble the wheel disc 70 to a wheel rim (not shown buy may be similar to wheel rim 20 shown in FIG. 3), the wheel disc 70 and the wheel rim are located relative to one another in a predetermined position. In particular, the outer surface 76A of the mounting flange 76 is positioned adjacent an inner surface of the wheel rim and a weld (not shown) is applied to join the wheel disc 70 and the wheel rim together to produce the fabricated well attached vehicle wheel. Preferably, in this embodiment, the weld consists of five discrete welds a respective one applied at each of the five spoke portions of the wheel. Alternatively, other welding patterns may be used to join the disc 70 to the rim including a full, continuous weld if so desired. Alternatively, the wheel rim and the wheel disc 70 may be joined together by using one or a combination of other suitable methods, such as for example, welding, adhesives, and mechanical fasteners, such as for example, rivets.

Figure 7:
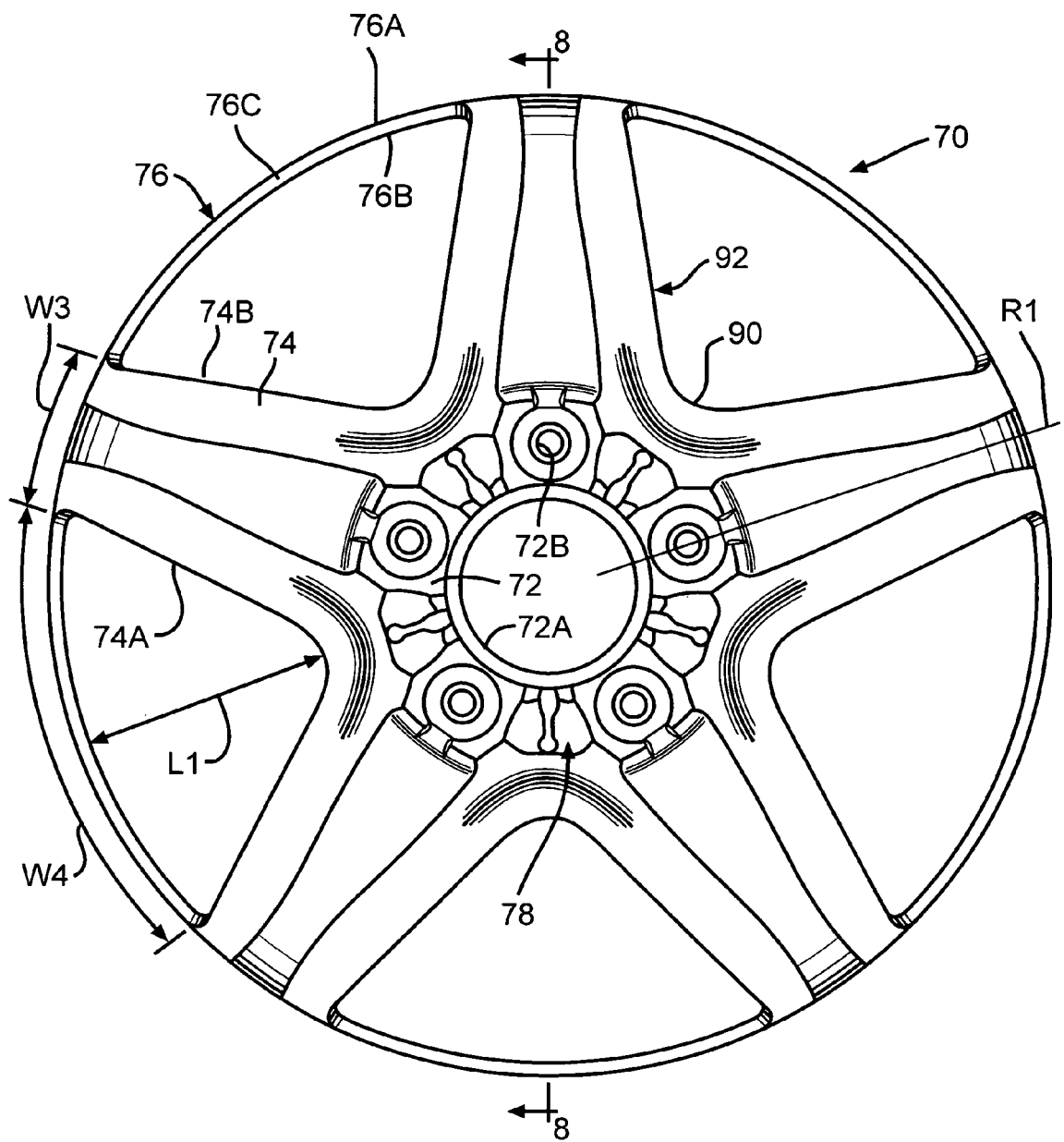
FIG. 7 is a view of a third embodiment of a wheel disc for use in a fabricated vehicle wheel.

As may be seen in FIG. 7, due to the construction of the wheel disc 70, the resultant wheel will have a relatively large vent window 92 formed therein between each pair of adjacent spokes 74. As shown in FIG. 7, each window 92 has a predetermined shape defined by each pair of adjacent spokes 74 and the side edge surface 76C of the rim connecting flange 76 such that each window 92 extends to an outermost periphery of the wheel disc 70.

As shown in this embodiment, each spoke 74 is a solid spoke having sides 74A and 74B. The sides 74A and 74B are tapered inwardly or toward each other as the spoke 74 extends outwardly to the flange 76. As a result of this, in the illustrated embodiment each spoke 74 defines an angular extent W3, which is defined at an outer radial periphery of the spoke, and each vent window 90 defines an angular extent W4, which is defined at an outer radial periphery of the window. Preferably, in the illustrated embodiment, the vent window angular extent W4 is greater than the spoke angular extent W3. More preferably, in this embodiment, due to the tapered spokes 74, the vent window angular extent W4 is at about 2.5 times the spoke angular extent W3. Also, in the illustrated embodiment, each vent window 90 defines a radial length L1, which is defined between the outer radially periphery of the vent window and the inner nose portion 90 of the vent window. Preferably, the vent window length L1 is greater than the spoke angular extent W3. Alternatively, one or more of the angular extents W3 and W4 and the length L1 may other than illustrated if so desired.

Also, while the wheel disc 70 is shown for use in constructing a fabricated well attached vehicle wheel, the wheel disc 70 may be used to produce other types of fabricated vehicle wheels. For example, the wheel disc 70 could be used to produce a fabricated bead seat attached vehicle wheel or a fabricated full face vehicle wheel. Also, as shown in FIG. 7, each spoke 74 defines a radial line R1 intersecting the wheel axis X1 and each spoke 74 is preferably symmetrical with respect to the radial line R1. In addition, as shown in FIG. 7, each of the lug bolt holes 72B is preferably located along the radial line R1 of each of the spokes 74.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A fabricated vehicle wheel comprising:
   a wheel rim including an inboard tire bead seat retaining flange, an inner tire bead seat, a well, an outer tire bead seat, and an outboard tire bead seat retaining flange;
   a fabricated single piece wheel disc joined to said wheel rim and defining a wheel axis, said wheel disc including an inner wheel mounting pad, an outer annular rim connecting flange and a plurality of radial spokes connecting said inner wheel mounting pad to said rim connecting flange, said inner wheel mounting pad provided with a centrally located pilot aperture and a plurality of lug bolt receiving holes circumferentially spaced around said pilot aperture, said rim connecting flange extending in an axial direction and including a side edge surface extending between each pair of adjacent spokes and facing in a generally axial outboard direction, wherein each of said spokes defines a radial line intersecting said wheel axis and each of said spokes is symmetrical with respect to said radial line, and wherein each of said lug bolt holes is located along said radial line of each of said spokes; and
   a separate window formed in said wheel disc between each pair of adjacent spokes, each window having a predetermined shape defined by said adjacent spokes and said side edge surface of said rim connecting flange such that each window extends to an outermost periphery of said wheel disc;
   wherein said inner wheel mounting pad includes only one rib provided therein between each pair of said lug bolt receiving holes, said rib having an outer surface and an inner surface, wherein said outer surface of said rib includes a pair of side portions a center portion, said side portions being generally curved surfaces and said center portion being a generally planar surface, wherein said center portion of said rib includes an inner end portion and an outer end portion, said inner end portion originating in said inner wheel mounting pad adjacent said pilot aperture, said outer end portion extending into said wheel disc near a nose portion of said window, wherein said inner end portion extends generally parallel with respect to an axis of said inner wheel mounting pad and generally perpendicular with respect to said wheel axis and extends a first distance, and wherein said outer end portion extends at an angle relative to said wheel axis and extends a second distance.

2. The fabricated vehicle wheel of claim 1 wherein said rib is defined by a raised area which extends outwardly from said inner wheel mounting pad.

3. The fabricated vehicle wheel of claim 1 wherein said first distance is approximately between about 2.5 mm to about 7.5 mm and said second distance is approximately between about 20 mm to about 40 mm.

4. The fabricated vehicle wheel of claim 1 wherein said angle is in the range of from about 15 degrees to about 75 degrees.

5. The fabricated vehicle wheel of claim 1 wherein each spoke defines an angular extent which is defined at an outer radial periphery of said spoke and each window defines an angular extent which is defined at an outer radial periphery of said, and wherein said window angular extent is about 2.5 times greater than spoke angular extent.

6. The fabricated vehicle wheel according to claim 1 wherein said wheel disc and said wheel rim are joined together by welding.

7. The fabricated vehicle wheel according to claim 1 wherein said spokes are formed integral with said inner wheel mounting pad and said rim connecting flange.

8. The fabricated vehicle wheel according to claim 1 wherein said fabricated vehicle wheel is a fabricated well attached vehicle wheel.

9. The fabricated vehicle wheel according to claim 1 wherein said wheel rim is formed from steel, aluminum or alloys thereof, magnesium or titanium and said wheel disc is formed from steel, aluminum or alloys thereof, magnesium or titanium.

10. The fabricated vehicle wheel according to claim 1 wherein said spokes of said wheel disc are solid spokes which project inwardly.

11. A fabricated vehicle wheel comprising:
a fabricated wheel rim including an inboard tire bead seat retaining flange, an inner tire bead seat, a well, an outer tire bead seat, and an outboard tire bead seat retaining flange;
a fabricated single piece wheel disc joined to said wheel rim by welding and defining a wheel axis, said wheel disc including an inner wheel mounting pad, an outer annular rim connecting flange and a plurality of radial solid spokes connecting said inner wheel mounting pad to said rim connecting flange, said inner wheel mounting pad provided with a centrally located pilot aperture and a plurality of lug bolt receiving holes circumferentially spaced around said pilot aperture, said rim connecting flange extending in an axial direction and including a side edge surface extending between each pair of adjacent spokes and facing in a generally axial outboard direction, each of said spokes defining a radial line intersecting said wheel axis, each of said spokes being symmetrical with respect to said radial line, and each of said lug bolt holes being located along said radial line of each of said spokes; and
a separate window formed in said wheel disc between each pair of adjacent spokes, each window having a predetermined shape defined by said adjacent spokes and said side edge surface of said rim connecting flange such that each window extends to an outermost periphery of said wheel disc;
wherein said inner wheel mounting pad includes only one rib provided therein between each pair of said lug bolt receiving holes, said rib having an outer surface and an inner surface, wherein said outer surface of said rib includes a pair of side portions a center portion, said side portions being generally curved surfaces and said center portion being a generally planar surface, wherein said center portion of said rib includes an inner end portion and an outer end portion, said inner end portion originating in said inner wheel mounting pad adjacent said pilot aperture, said outer end portion extending into said wheel disc near a nose portion of said window, wherein said inner end portion extends generally parallel with respect to an axis of said inner wheel mounting pad and generally perpendicular with respect to said wheel axis and extends a first distance, and wherein said outer end portion extends at an angle relative to said wheel axis and extends a second distance.

12. The fabricated vehicle wheel of claim 11 wherein said first distance is approximately between about 2.5 mm to about 7.5 mm, said second distance is approximately between about 20 mm to about 40 mm, and said angle is in the range of from about 15 degrees to about 75 degrees.

13. The fabricated vehicle wheel of claim 11 wherein each spoke defines an angular extent which is defined at an outer radial periphery of said spoke and each window defines an angular extent which is defined at an outer radial periphery of said, and wherein said window angular extent is about 2.5 times greater than spoke angular extent.

* * * * *